US008256940B2

(12) United States Patent
Brown et al.

(10) Patent No.: US 8,256,940 B2
(45) Date of Patent: Sep. 4, 2012

(54) SECURABLE COVER WITH ELECTRICALLY ACTIVATABLE LIGHT INHIBITING LENS FOR VEHICLE LIGHTS

(75) Inventors: Alyn Brown, North Aurora, IL (US); James Wiff, Cologne, MN (US)

(73) Assignee: Control Solutions LLC, Aurora, IL (US)

( * ) Notice: Subject to any disclaimer, the term of this patent is extended or adjusted under 35 U.S.C. 154(b) by 587 days.

(21) Appl. No.: 12/560,861

(22) Filed: Sep. 16, 2009

(65) Prior Publication Data

US 2011/0063864 A1 Mar. 17, 2011

(51) Int. Cl.
*G02F 1/15* (2006.01)
*B60Q 1/14* (2006.01)
*F21S 8/10* (2006.01)

(52) U.S. Cl. .......... 362/509; 701/36; 359/296; 359/265; 362/464

(58) Field of Classification Search .................. 362/509, 362/464; 701/36; 359/265–275, 296
See application file for complete search history.

(56) References Cited

U.S. PATENT DOCUMENTS 3,519,742 A 7/1970 Bjelland
4,033,677 A 7/1977 Tausch
4,664,934 A 5/1987 Ito et al.
4,750,834 A 6/1988 Fateley
4,872,745 A 10/1989 Fujisawa et al.
4,887,890 A 12/1989 Scherber
4,947,291 A 8/1990 McDermott
5,076,673 A 12/1991 Lynam
5,105,303 A 4/1992 Ilhage
5,115,848 A 5/1992 Malone
5,128,799 A 7/1992 Byker
5,255,163 A 10/1993 Neumann et al.
5,261,722 A 11/1993 Staley et al.
5,384,653 A 1/1995 Benson et al.
5,412,492 A 5/1995 Zammit et al.
5,438,452 A 8/1995 Gruber
5,481,395 A 1/1996 Byker
5,517,389 A 5/1996 Myers
5,521,744 A 5/1996 Mazurek
5,631,765 A 5/1997 Baur et al.
5,659,423 A 8/1997 Schierbeek et al.
5,681,103 A 10/1997 Remillard et al.

(Continued)

OTHER PUBLICATIONS webBikeWorld. Akuma Electrochromatic Visor [online]. (Feb. 2008) [retrieved Feb. 2, 2009]. Retrieved from the Internet: <URL: http://www.webbikeworld.com/motorcycle-accessories/2006/electrochromatic-visor.htm>.

(Continued)

*Primary Examiner* — Anabel Ton
(74) *Attorney, Agent, or Firm* — The Eclipse Group LLP

(57) ABSTRACT

A cover for use in connection with a vehicle light having a light source and a light reflector is provided. A lens of the cover has an electrically activatable material switchable between a light inhibiting state and a light transmissive state. The electrically activatable material prevents the transmission of visible light from entering into and reflecting out from the vehicle light when the electrically activatable material is set to the light inhibiting state. The lens has an area without having the electrically activatable material such that visible light from the light source is also to pass through the area. A baffle having the electrically activatable material extends from the body of the lens. The baffle blocks a portion of the visible light that passes through the area of the lens from traveling in certain directions when the electrically activatable material is in the light inhibiting state.

46 Claims, 7 Drawing Sheets

U.S. PATENT DOCUMENTS

| | | | | |
|---|---|---|---|---|
| 5,729,379 | A | 3/1998 | Allemand et al. | |
| 5,763,050 | A | 6/1998 | Hirmer | |
| 5,829,870 | A | 11/1998 | Remillard et al. | |
| 5,994,840 | A | 11/1999 | Forsdyke et al. | |
| 6,039,390 | A | 3/2000 | Agrawal et al. | |
| 6,429,961 | B1 | 8/2002 | Harary et al. | |
| 6,491,416 | B1 * | 12/2002 | Strazzanti | 362/464 |
| 6,493,128 | B1 | 12/2002 | Agrawal et al. | |
| 6,583,919 | B1 | 6/2003 | Mizutani et al. | |
| 6,588,026 | B2 | 7/2003 | Meier et al. | |
| 6,703,981 | B2 | 3/2004 | Meitzler et al. | |
| 6,774,988 | B2 * | 8/2004 | Stam et al. | 356/218 |
| 6,963,437 | B2 | 11/2005 | Bauer et al. | |
| 7,029,151 | B2 | 4/2006 | Strazzanti | |
| 7,042,617 | B2 | 5/2006 | Kosc et al. | |
| 7,349,144 | B2 | 3/2008 | Varaprasad et al. | |
| 7,365,896 | B2 | 4/2008 | Kuwabara et al. | |
| 7,440,205 | B2 | 10/2008 | Malfait et al. | |
| 7,452,067 | B2 | 11/2008 | Gross | |
| 8,096,689 | B2 * | 1/2012 | Engl et al. | 362/514 |
| 8,200,390 | B2 * | 6/2012 | Brown et al. | 701/36 |
| 2004/0105264 | A1 | 6/2004 | Spero | |
| 2004/0165267 | A1 | 8/2004 | Oishi et al. | |
| 2005/0200934 | A1 | 9/2005 | Callahan et al. | |
| 2008/0094851 | A1 | 4/2008 | Engl et al. | |

OTHER PUBLICATIONS

Advanced Industrial Science and Technology. Successful Development of a Thin Film for a Switchable Mirror That Can be Switched Between Reflective and Transparent States [online]. (Dec. 2006) [retrieved Jun. 24, 2009]. Retrieved from the Internet: <URL: http://www.aist.go.jp/aist_e/latest_research/2007/20070129/20070129.

Bill Kirtz, "Chameleon Windows Haven't Shown Their True Colors Yet", Glass Magazine (Oct. 2004), pp. 50-56.

DuPont TechnolgyBank Single Layer Electrochromatic Polymer Technology for Automotive and Architectural Glazing Light Control [online]. [retrieved Feb. 2, 2009]. Retrieved from the Internet: <URL: http://dupont.t2h.yet2.com/t2h/page/techpak?keyword=electrochromatic+polymer+film&id=41766&qid=1500702&sid=10&args=3%25091%25091500702%2509%2509electrochromatic%2Bpolymer%2Bfilm%2509%2509-1>.

DuPont TechnologyBank. Single Layer Electrochromatic Polymer Technology for Automotive and Architectural Glazing Light Control [online], [retrieved Feb. 2, 2009]. Retrieved from the Internet: <URL: http://dupont.t2h.yet2.com/t2h/page/techpak?keyword=electrochromatic+polymer+film&args=3%25091%25091500702%2509%2509electrochromatic%252Bpolymer%252Bfilm%2509%2509%2509-1&id=41766&qid=15007028sid=10&abc=0&page=novelty>.

Research Frontiers Inc. SPD-SmartGlass [online]. [retrieved Feb. 2, 2009]. Retrieved from the Internet: <URL: http://www.smartglass.com>.

Research Frontiers Inc. SPD-Smart Products—Overview [online]. [retrieved Feb. 2, 2009]. Retrieved from the Internet: <URL: http://www.smartglass.com/spd.asp>.

Research Frontiers Inc. SPD—Smart Products—Architectural [online]. [retrieved Feb. 2, 2009]. Retrieved from the Internet: <URL: http://www.smartglass.com/spd.asp?sec=architectural>.

Research Frontiers Inc. SPD—Smart Products—Aerospace [online]. [retrieved Feb. 2, 2009]. Retrieved from the Internet: <URL: http://www.smartglass.com/spd.asp? sec=aerospace>.

Research Frontiers Inc. SPD—Smart Products—Automotive [online]. [retrieved Feb. 2, 2009]. Retrieved from the Internet: <URL: http://www.smartglass.com/spd.asp?sec=automotive>.

Research Frontiers Inc. SPD—Smart Products—Marine [online]. [retrieved Feb. 2, 2009]. Retrieved from the Internet: <URL: http://www.smartglass.com/spd.asp?sec=marine>.

Research Frontiers Inc. SPD—Smart Products—Appliances [online]. [retrieved Feb. 2, 2009]. Retrived from the Internet: <URL: http://www.smartglass.com/spd.asp?sec=appliances>.

Research Frontiers Inc. SPD—-Smart Products—Eyewear [online]. [retrieved Feb. 2, 2009]. Retrieved from the Internet: <URL: http://www.smartglass.com/spd.asp?sec=eyewear>.

Research Frontiers Inc. SPD—Smart Products—Displays [online]. [retrieved Feb. 2, 2009]. Retrieved from the Internet: <URL: http://www.smartglass.com/spd.asp?sec=displays>.

Research Frontiers Inc. FAQs—Characteristics of Smart Products [online]. [retrieved Oct. 14, 2009]. Retrieved from the Internet: <URL: http://www.smartglass.com/faqs.asp?topic=10003>.

Aurora Cord & Cable Company. Aurora Cord & Cable: Blackout Driving Light [online]. [retrieved Jul. 20, 2009]. Retrieved from the Internet: <URL: http://www.auroracord.com/products/blackoutdrivinglight.cfm>.

Gentex Corporation. Homepage [online]. [retrieved Apr. 8, 2009]. Retrieved from the Internet: <URL: http://www.gentex.com>.

Gentex Corporation. Exterior Mirrors [online]. [retrieved Oct. 14, 2009]. Retrieved from the Internet: <URL: http://ww.gentex.com/auto_plo_exterior.html>.

Integrated Publishing. Blackout Lights [online]. [retrieved Oct. 14, 2009]. Retrieved from the Internet: <URL: http://www.tpub.com/content/construction/14273/css/14273_78.htm>.

SwitchLite Privacy Glass. Home [online]. [retrieved Oct. 14, 2009]. Retrieved from the Internet: <URL: http://www.switchlite.com/home.html>.

Sage Electronics, Inc. The Power to Change [online]. [retrieved Oct. 14, 2009]. Retrieved from the Internet: <URL: http://www.sage-ec.com/>.

E Ink Corporation. Low Power, Electronic Paper Displays [online]. [retrieved Oct. 14, 2009]. Retrieved from the Internet: <URL: http://www.eink.com>.

ChromoGenics AB. Homepage [online]. [retrieved Oct. 14, 2009]. Retrieved from the Internet: <URL: http://www.chromogenics.se/index_eng.htm>.

* cited by examiner

SECURABLE COVER WITH ELECTRICALLY ACTIVATABLE LIGHT INHIBITING LENS FOR VEHICLE LIGHTS

FIELD OF THE INVENTION

This invention relates to a cover that is securable to lights of a vehicle such as the front or rear lights on a military or a security vehicle. In particular, the invention relates to a securable cover that is adapted to selectively block out light reflected from a light source of a vehicle such as a security vehicle or military vehicle.

BACKGROUND

Conventional lighting for military ground vehicles often utilize OEM lights or an accessory light bar having several high intensity discharge (HID) and/or infrared (IR) lights in a hardwired configuration permanently attached to the vehicle. The lights are generally fixed in position at the time of installation and are hardwired into the vehicle power and switching.

The observability of the vehicle due to reflections off the vehicle lights during certain field operations may be undesirable. For instance, if a military vehicle light is not turned on and the vehicle is in an open position, detection of the vehicle may occur because of light reflecting off reflectors adjacent to a light source of a vehicle light module.

Additionally, military vehicles, especially those used in combat situations, often require the head and tail lights of the vehicle to function in different modes of operation in order to adapt to various conditions that may occur during a mission. For instance, when operating at night on a mission, the front driving lights and tail lights are often covered with mechanical blinders or covers. These mechanical blinders or covers are used in an effort to limit light output, the beam pattern, and the visibility of the lights to potential hostiles. Moreover, coverings such as duct tape have been placed over the lights, at certain times, in an effort to reduce light reflectivity.

Prior to going on a mission the blinders or covers are installed on the lights of the vehicle. The covers may then need to be manually removed depending on the mission. This is often both time consuming and exposes the covers to loss and damage upon repeated installation and removal for storage. Accordingly, there is a need for a cover for vehicle lights, such as lights for security or military combat vehicles, that is adapted to selectively block ambient or reflected light from entering or leaving portions of the vehicle light in a convenient way.

SUMMARY

A cover for use in connection with a vehicle light having a light source and a light reflector is provided. A lens of the cover has an electrically activatable material switchable between a light inhibiting state and a light transmissive state. The electrically activatable material prevents the transmission of visible light from entering into and reflecting out from the vehicle light when the electrically activatable material is set to the light inhibiting state. The lens has an area without having the electrically activatable material such that visible light from the light source is able to pass through the area. A baffle having the electrically activatable material extends from the body of the lens. The baffle blocks a portion of the visible light that passes through the area of the lens from traveling in certain directions when the electrically activatable material is in the light inhibiting state.

A method of utilizing a cover for use in connection with a vehicle light having a light source and a light reflector. A lens is provided with an electrically activatable material that is switchable between a light inhibiting state and a light transmissive state. The electrically activatable material prevents the transmission of visible light from entering into and reflecting out from the vehicle light when the electrically activatable material is set to the light inhibiting state. The lens has an area without the electrically activatable material such that visible light from the light source is able to pass through the area of the lens. A baffle having the electrically activatable material is extended from the body of the lens. The baffle blocks a portion of the visible light that passes through the area of the lens when the electrically activatable material is in the light inhibiting state.

DETAILED DESCRIPTION

Figure 1:
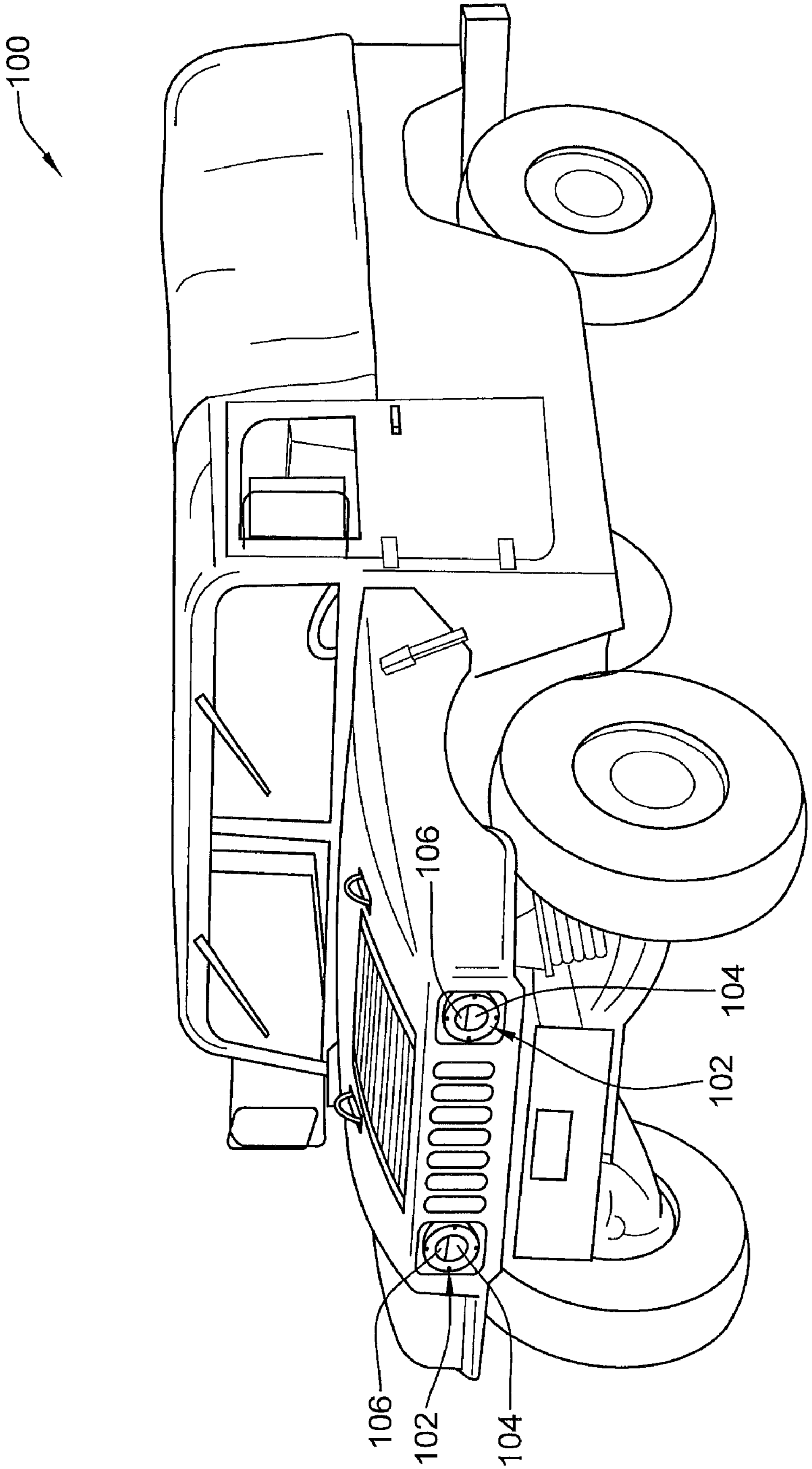
FIG. 1 is a perspective view of a military vehicle with electrically activatable light-blocking covers positioned over military vehicle lights.

FIG. 1 is a perspective view of a vehicle 100 with covers 102 positioned over vehicle lights. The vehicle 100 may be, for example, a military vehicle such as a High Mobility Multipurpose Wheeled Vehicle (HMMWV, or "Hummvee"), or any other vehicle that may be used in conditions in which it is desirable that the vehicle remain undetectable. For example, a Hummvee, or other military transport vehicles, may be used to carry military personnel into areas of battlefield conditions. At night, it is desirable to remain undetectable to any enemy personnel that may be in the area. It may also be desirable for security vehicles, such as vehicles used for special operations, police operations, private security or other security purposes, to be visually undetectable in certain situations. In such situations, for instance, a security or military vehicle may turn its lights off. Currently, military ground vehicles use a light bar composed of several high intensity discharge (HID) and/or infrared (IR) lights in a hardwired configuration permanently attached to the vehicle 100 as well as original equipment manufacturer (OEM) headlights and tail lights. The light assemblies typically include reflective elements, particularly behind the lights to improve illumination. When turned off while approaching battlefield conditions, the lighting assemblies may reflect incident light thereby risking detection by enemy personnel. In the military vehicle 100 in FIG. 1, for example, a driver or passenger may activate the covers 102 to reduce the chances of detection due to incident visible light reflections when turning the lights off and reduce the IR signature. The vehicle light covers in this instance are not necessarily used to completely block out the IR and visible light reflections, but rather may often be used in convoys where some light is needed to see as well as the ability to see the next vehicle ahead in the convoy.

As seen herein, the vehicle light covers 102 have a lens 104 comprising electrically activatable material that is switchable between a light inhibiting state and a light transmissive state. The electrically activatable material prevents the transmission of visible light from entering into and reflecting out from the vehicle light when the electrically activatable material is set to the light inhibiting state. The lens 104 has an area, such as a slot opening, without the electrically activatable material and operates such that visible light from a light source of the vehicle light is able to pass through the area. A baffle 106 extending from the body of the lens also has the switchable electrically activatable material. The lens 104 and the baffle 106 together, block external ambient light from traveling into the vehicle light module and prevents the external ambient light from reflecting off a light reflector, when the electrically activatable material is set to the light inhibiting state. In this instance, the lens prevents light transmitted from a light source from traveling outside the vehicle light assembly. The baffle 106 also blocks a portion of the visible light that passes through the slot opening of the lens 104 when the electrically activatable material is in the light inhibiting state. In particular, the baffle 106 blocks light rays originating from a light source of the vehicle light from traveling in a generally upward and forward direction from the vehicle (as well as from the sides of the vehicle) when the electrically activatable material is set to the light inhibiting state.

Figure 2:
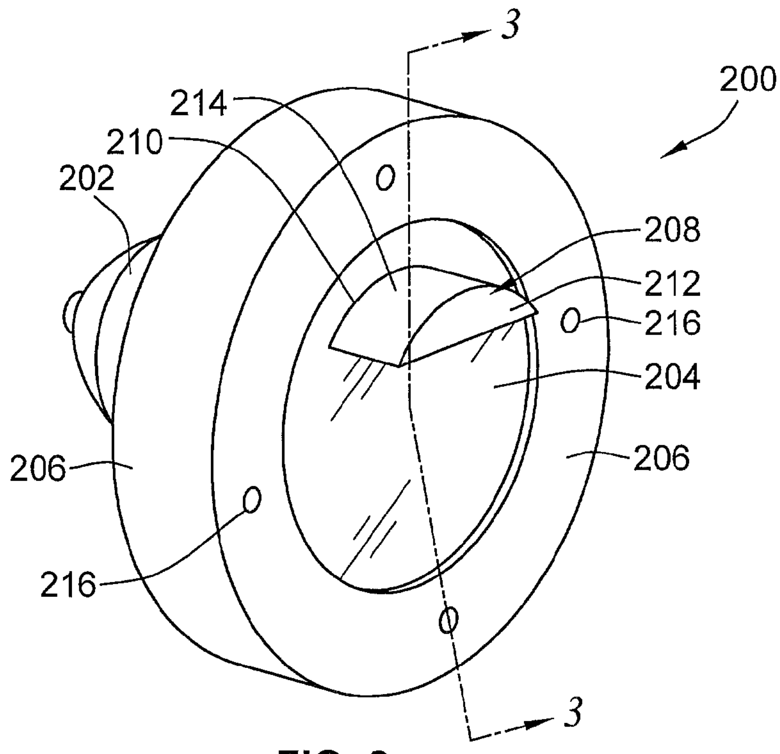
FIG. 2 is a perspective side view of an example of the cover installed over a military vehicle light.

FIG. 2 is a side perspective view of an example of a vehicle light cover 200 installed over a military vehicle light 202. The vehicle light cover 200 includes a lens 204 supported by a bezel 206. As seen in the embodiment of FIG. 2, a baffle 208 is integrally formed with and extends from the body 210 of the lens 204. The baffle 208 has vertical wall 212 that is spaced apart from the body 210 of the lens 204 and lateral partition 214 that connects the vertical wall 212 to the body of the lens 204. The cover 200 may be affixed, for example, to the military vehicle light 202 using a set of screws 216. In one example implementation, the vehicle light cover 200 may be installed over the current light 202 as a kit, replacing the current lens, or it may be added as a cover. As such, the kit may be a retrofit and left in place once installed. The cover 200 may be affixed using clips, or adhesives, or using other fixing devices. The cover 200 may be connected to a switch on an operator panel accessible by a user in the vehicle to switch between light transmissive and light inhibiting states of the electrically activatable lens 204. The switch may operate the cover 200 independently, or may be connected in parallel with the light 202 for operation in conjunction with the light 202.

Figure 3:
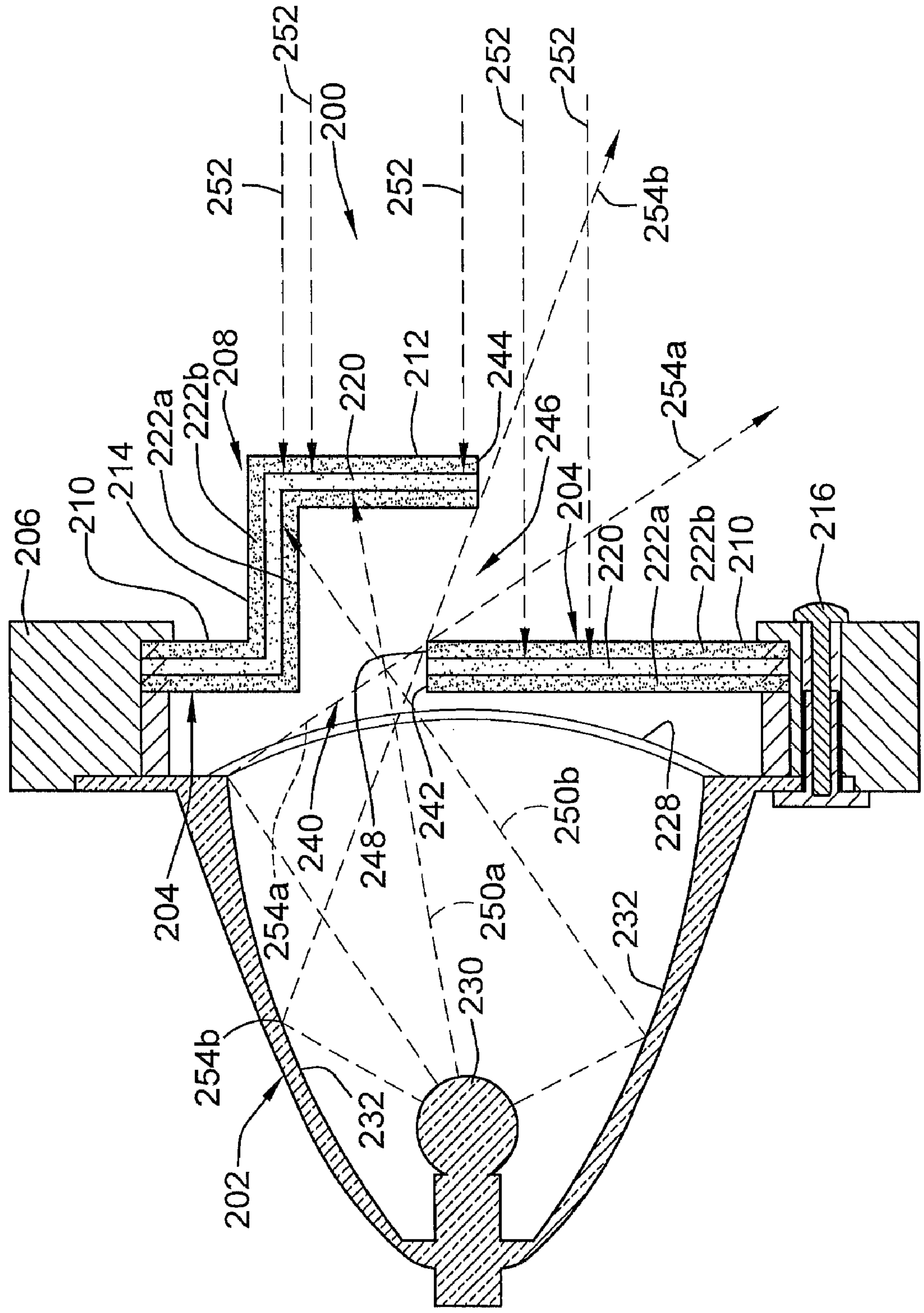
FIG. 3 is a cross-sectional side view at section 2-2 of the cover shown in FIG. 2.

FIG. 3 is a side cross-sectional view of section 2-2 of the vehicle light cover 200 in FIG. 2. In this example, the cover 200 includes an electrically activatable film 220 disposed between transparent layers 222*a, b*. The cover 200 may be provided as an assembly that includes the bezel 206, the screws 216, the transparent layers 222*a, b*, and the electrically activatable film 220. The lens 204 may also come pre-fabricated with the electrically activatable film 220 attached to the transparent layers 222*a, b* of the lens. The cover 200 may then fit over the light 202. The light 202 in this embodiment includes a light lens 228, a lighting source 230 and a reflective inner surface of light reflector 232. In normal operation, the lighting element 230 may be turned 'on' to generate light out through the light lens 228. The reflective surface of light reflector 232 is configured to reflect any incident light through the light lens 228. Even if the light 202 is turned 'off,' the light reflector surface 232 may reflect any incident light that should enter via the light lens 238.

In conditions in which the driver of the vehicle desires to be more difficult to detect, the driver or a passenger may switch an actuator that darkens the lens 204 of cover 200. The vehicle light cover 200 may then inhibit visible light from passing the electrically activatable film 220 in either direction. Visible light from the light source 230 is prevented from passing out of the electrically activatable film 220, or from entering into the reflective inner surface of light reflector 232 from outside.

As seen in the example in FIG. 3, the lens 204 has an area 240 without the electrically activatable film 220 in order to allow a certain amount of visible light from light source 230 to pass through the area. The area 240 of the lens 204 not having an electrically activatable layer 220 may be, for example, a slot opening in the lens 204. Baffle 208 is integrally formed with the lens 204 and extends from the body 210 of the lens. In this example, the baffle 208 also has the layer of electrochromatic film 220 positioned between the layers of transparent material 222 *a, b*. The electrically activatable material 220 of the baffle 208 and lens 204 operates such that the baffle blocks a portion of the visible light (e.g., 250*a, b*) that passes through the slot opening 240 from traveling in certain directions when the electrically activatable material 220 is in the light inhibiting state. The lens 204 together with the baffle 208 further block external ambient light 252 from traveling into the vehicle light module 202 to prevent the external ambient light 252 from reflecting off the light reflector 232 when the electrically activatable material 220 is set to the light inhibiting state. The slot opening 240 is provided in lens 204 to allow light to pass through until it reaches the baffle 208. The baffle 208 blocks external ambient light from reflecting off light reflector 232 and shining upward when the lens 204 is in the light inhibiting state. With the lens 204 of cover 200 switched to the light inhibiting state, light rays are blocked from spreading out in specific directions, notably upward and substantially forward from the vehicle in the example seen in FIG. 3.

In the example embodiment in FIG. 3, the baffle 208 has substantially vertical wall 212 spaced apart from the body 210 of the lens 204 and a lateral partition 214 that connects the substantially vertical wall 212 to the body 210 of the lens. Vertical wall 212 is adapted to block visible light (e.g., 250*a*, 252) from entering or leaving the light module 202 when the electrically activatable material 220 is in the light inhibiting state. The lateral partition 214 likewise blocks visible light (e.g., 250*b*) when the electrically activatable material is in the light inhibiting state.

Vertical wall 212 of the baffle 208, in this example, is spaced apart from and aligned in a substantially parallel direction with the slot opening 240. As seen in FIG. 3, the vertical length of the vertical wall 212 is greater than the vertical length of the slot opening 240 thereby creating an overlap of the electrically activatable material 220. As such, the bottom end 242 of the slot opening 240, in this embodiment, is positioned above the bottom end 244 of the substantially vertical wall 212 of the baffle 208.

In this configuration, only a portion of reflected light (e.g., 254*a, b*) that has reflected off the light reflector 232 from the light source 230 exits the lens 204 through the slot opening 240 and an opening 246 between the substantially vertical wall 212 of the baffle 208 and a lower wall 248 of the body of the lens 204. As seen in FIG. 3, the baffle 208 blocks light rays (e.g., 250*a, b*) originating from the light source 230 from traveling in a generally upward and forward direction from the vehicle when the electrically activatable material 220 is set to the light inhibiting state. Additionally, the baffle 208 blocks light rays from traveling in a generally sideward direction from the vehicle when the lens 204 is in the light inhibiting state because the lateral partition 214 is generally curved in an arcuate shape such that the bezel wraps around the sides as an eyebrow.

Various OEM light assembly modules may have different design configurations (and light source positions relative to the slot and baffle) and thus, the position of the slot opening, the length of the vertical wall of the baffle, and the distance between the slot opening and the vertical wall of the baffle may be configured differently in different design applications. As the length of the vertical wall of the baffle increases, less light reflecting off the light reflector is allowed to pass in the light inhibiting state forming a smaller light pattern. As the length of the slot opening is enlarged (or its bottom height lowered) with respect to the baffle, the light output will increase and the light pattern away from the vehicle will become larger. The light pattern and focus of the pattern may be tailored for each light assembly module installation. Factors in determining the light emitted from the cover may include the geometry of the light assembly module, the shape of the light reflector, positioning of the light source relative to the light reflector, positioning of the light source relative to the slot opening, length of the slot opening, position of the bottom of the slot relative to the bottom of the baffle vertical wall (eyebrow), and the distance between the baffle vertical wall and the slot.

In an example implementation, the electrically activatable film 220 may include an electrochromatic polymer (ECP) film, a material used in liquid crystal displays (LCD), and/or organic materials, such as organic materials that may be used in LCDs. One example type of ECP material activates when a voltage of 1 VDC is applied to the film. An example implementation may alternatively use a simple photocell to drive the system such that when the light module 202 is turned on, sufficient voltage may be applied to activate the system and to drive the ECP film to a state that will pass light. When the light is turned off, the system would darken.

As seen, the electrically activatable material may be provided in various constructions, such as a film that can be disposed between transparent layers. Other material constructions may use a vapor deposition process on two adjacent faces of two layers of material and some with additional liquid material in between, for example. Electrical activation may be applied to the two layers, for example, causing migration of certain elements to one layer or the other producing a desired effect. In another example, a suspended particle device (SPD) film may be used with an inverter that produces AC voltage to drive the film. The electrically activatable material may also include phase dispersed liquid crystals (PDLCs), materials known as SageGlass® from Sage Electrochromics, Inc., and electrochromatic materials provided by Chromogenics AB.

In general, the film may determine how the vehicle light cover 200 is activated. Two scenarios include:

1. A film that is energized to a light inhibiting state;
2. A film that is de-energized to a light inhibiting state.

In one example, the film may include multiple layers each having specific functions. For example, the film may include an electrochromopore, an electrolyte layer, and an ion storage layer. In such films, the electrolyte layer is typically a liquid or a gel. In another example, the film may be a rigid or flexible electrochromatic polymer that may be cast from solution on a glass or poly (ethylene terephthalate) ("PET") substrate. The assembly may then be heated under pressure to laminate the structures. The laminated assembly may include optically transparent electrodes, such as for example, indium tin oxide (ITO) layers that may be deposited on the glass or PET substrate and configured for connection to a power supply.

In another implementation, the film may include electrochromic glazing consisting of five thin-film ceramic layers coated directly onto glass. Electrochromic glazing may be implemented similar to low-emissivity glazing used to make energy efficient windows, but in a circuit that enables switching between light transmission or light blocking as desired.

In another implementation, the film may include a suspended particles device (SPD), which uses small light-absorbing particles, otherwise known as "light valves." For example, a SPD may be sandwiched between glass or plastic layers and connected via electrical leads to an AC power source. In the 'off' state, the particles are randomly distributed in the SPD and block light incident on the glass or plastic wall from passing through. In the 'on' state, the particles are aligned and allow the incident light to pass through.

In another implementation, a liquid-crystal sheet may be bonded between two layers of glass. The liquid crystal sheet may be connected to a power source. When switched to the 'on' state, the voltage rearranges the liquid-crystal molecules to allow light to pass through the glass. When switched to the 'off' state, the liquid-crystal molecules disperse light making the device opaque.

In some implementations, a selected film may be rigid enough to implement as a single layer precluding the need for other transparent layers 222*a, b* (in FIG. 3). In other implementations, the film may be laminated on one side of a transparent layer 222*a* or 222*b*. In certain embodiments, two or more layers of the film placed adjacent to one another may be used to achieve enhanced light blocking capabilities.

Figure 4:
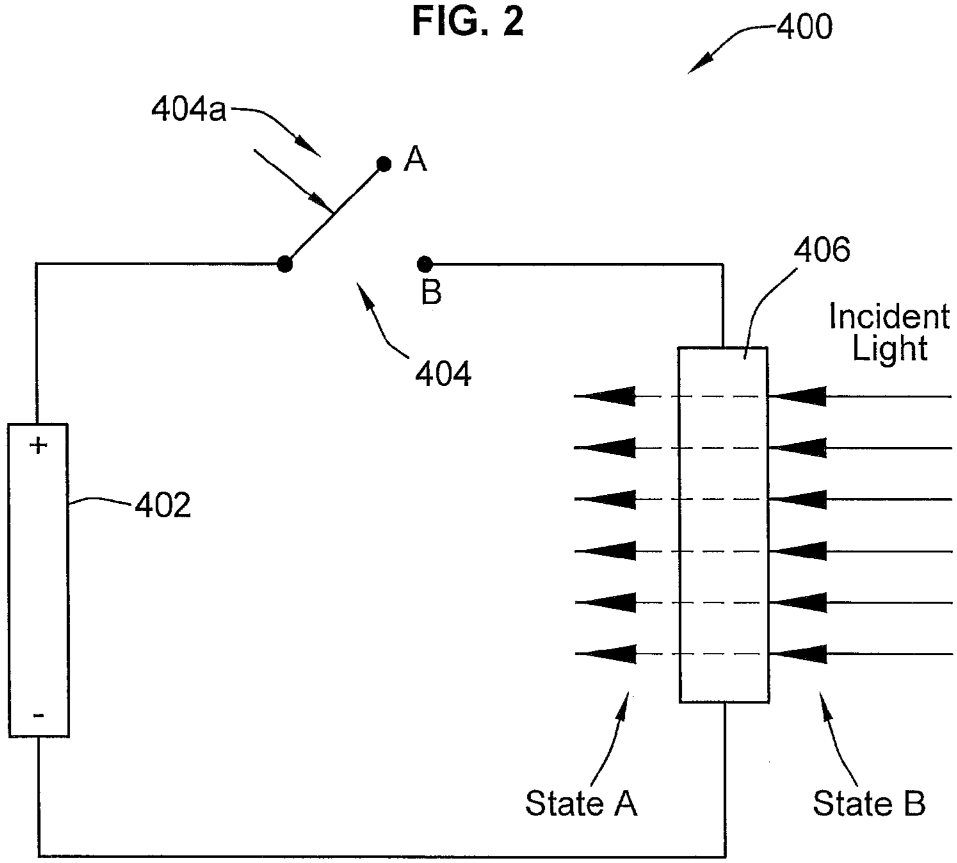
FIG. 4 is a schematic circuit diagram illustrating operation of an example cover.

FIG. 4 is a schematic circuit diagram illustrating operation of an example vehicle light cover. FIG. 4 shows a circuit 400 that includes a power supply 402 as an electrical power source, an electrical coupling device 404, and a vehicle light cover 406. The electrical coupling device 404 may be any device adapted to electrically couple the electrically activatable material in the vehicle light cover 406 to the power supply 402. The electrical coupling device 404 in FIG. 4 is shown as a switch that may be set to one of two states: State A or State B. The electrically activatable material may be activated from a remote location such as a crew compartment having a control panel within the vehicle.

In State A, the electrical coupling device 404 is open disabling the transfer of power from the power supply 402 to the vehicle light cover 406. State A is shown in FIG. 4 to allow incident light to pass through the vehicle light cover 406. State A represents normal operation in the example illustrated by FIG. 4. The vehicle's light may be turned on or off and the vehicle light cover 406 allows incident light to pass through to reflect off the reflective surface of light reflector 232 (in FIG. 3). Light generated by the light source 230 (in FIG. 3) is also allowed to pass through the blackout cover 406 in the opposite direction.

When the electrical coupling device 404 is closed to State B, power is coupled from the power supply 402 to the vehicle light cover 406 to inhibit incident light (including visible light) from passing through the cover 406. It is noted that the example shown in FIG. 4 assumes that the vehicle light cover 406 includes a film 220 that inhibits light when electrically energized. That is, the electrically activatable material becomes opaque upon being electrically energized and the electrically activatable material becomes transparent upon being electrically de-energized. The electrically activatable material becomes electrically energized upon reaching a voltage potential threshold such that the lens 204 does not allow the transmission of external ambient light 252 into the light reflector 232 of the vehicle light module 202.

In an example in which the film 220 inhibits light when electrically de-energized, States A and B would provide the opposite operation as that indicated above. That is, the electrically activatable material becomes opaque upon being electrically de-energized and the electrically activatable material becomes transparent upon being electrically energized. The electrically activatable material becomes electrically de-energized upon removal of a voltage potential threshold such that the lens does not allow the transmission of external ambient light into the light reflector 232 of the vehicle light module 202.

In another example, the film 220 may be in one state, such as opaque or transparent, with a voltage having a first polarity (for example, +/−) applied to it, and switch to the other state, such as transparent or opaque, when the polarity is switched (for example, to −/+).

The electrical coupling device 404 in FIG. 4 is depicted with an actuator 404*a*, or actuation device, illustrating alternative ways to change the state of the electrical coupling device 404. For example, the electrical coupling device 404 may be an on/off switch in a control panel accessible by a user in the cabin of the vehicle. The user may manually switch the electrical coupling device 404 from off to on, or vice versa depending on whether the user desires to be detectable. Referring to the example described above, the user may switch the switch 404 from State A (off) to State B (on) to block light and blackout the vehicle.

The switch actuator 404*a* may also be implemented as a toggle switch, a button, an actuator on a touch panel screen, or a sensor such as a photocell sensor with switch capabilities upon sensing light activity. The actuation device 404*a* may be any actuator employed to initiate change of operation modes.

In another example, the switch actuator 404*a* may be the same light switch that operates the vehicle lights. The vehicle lights may be connected to state a such that the blackout cover is enabled when the vehicle lights are turned off. In another example, states A and B may be reversed and the vehicle lights may be connected in parallel to the vehicle light cover 406.

The switch actuator 404*a* may be a hardwired switch, a software controlled switch, or a wireless control. For example, the switch actuator 404*a* may be an electronic switch connected to a controller that controls the vehicle light cover 406 systematically. For example, a control panel may be configured to place a vehicle in a battlefield condition such that activation of the cover 406 is one function performed to place the vehicle in battlefield condition. In another example, the switch actuator 404*a* may include a common light switch that is in battlefield mode when switched to one state to both darken the light modules as well as turn the lights off. The electrical coupling device 404 may also be implemented using a wireless connection to a control panel that may or may not be located in the vehicle itself. In alternative arrangements, electrical coupling device 404 may simply be an electrical conductor, such as a cable or copper wiring to electrically couple the electrically activatable material to a power source 402.

The power supply 402 may include the vehicle power supply coupled to the cover 406 via a control panel in the vehicle. The power supply 402 may also include a vehicle battery coupled via a control panel of the vehicle. The power supply 402 may also include an accessory battery coupled via a control panel adapted to re-charge the accessory battery based on conditions of a vehicle battery.

Figure 5:
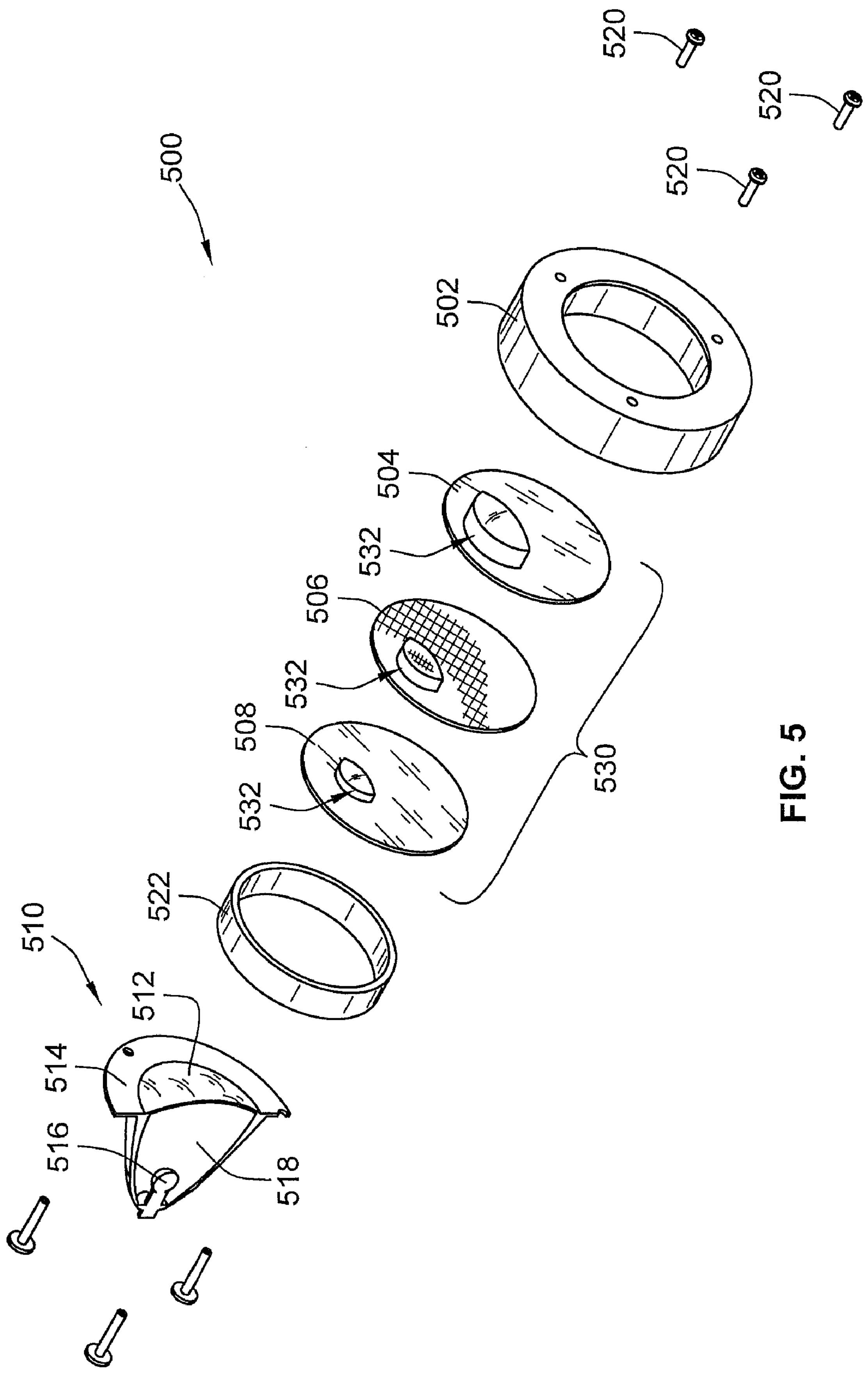
FIG. 5 is an exploded view of the cover and a vehicle light assembly.

FIG. 5 is an exploded view of a cover and military vehicle light assembly 500. The assembly 500 includes a bezel 502 for supporting the blackout cover assembly, a first transparent layer 504, an electrochromatic layer 506, a second transparent layer 508, and a light assembly 510. The light assembly 510 includes a light lens 512, a support structure 514, a light generating element 516, and a reflective inner surface 518. The electrochromatic layer 506 may be laminated to the transparent layers 504, 508 and fixed to the bezel 502 by a known fixing technique (for example, adhesive, screws, clips, etc.). The transparent layers 504, 508 may made of a glass or polycarbonate material, or of a glass material such as plexiglass or a bullet resistant glass. As seen in FIG. 5, the electrochromatic layer 506 and the transparent layers 504, 508 forming the electrochromatic lens 530 each have the baffle 532 shaped therein. The transparent layers 504, 508 laminated to electrochromatic layer 506 from lens 530 with baffle 532 extending from the body of the lens 530. The blackout cover assembly may then be fixed to the light assembly 510 using screws 520, or any other fixing technique. A spacer 522 may also be provided to create space and an air gap between the lens 530 of the cover and light lens 512 of light module 510. In an alternative configuration, the vehicle light cover assembly 500 may include at least one rim adapted for releasable securement of the cover to the vehicle light module 510. The releasably securable rim, for example, may be formed from a metal, rubber molded or composite material.

Figure 6A:
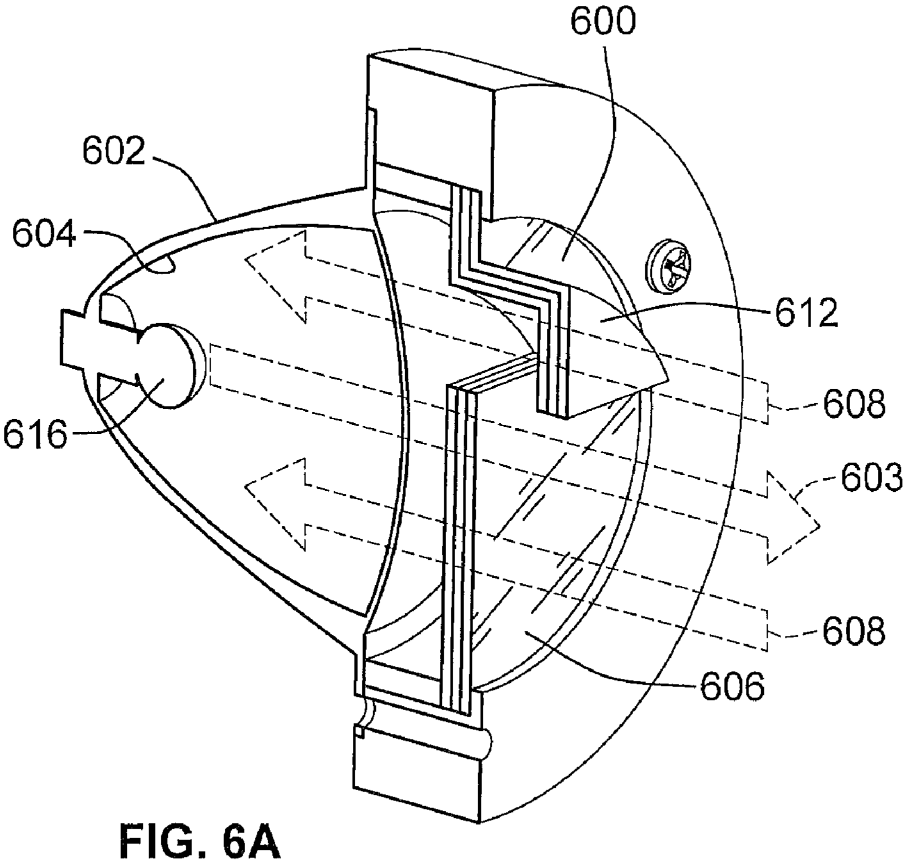
FIG. 6A illustrates one mode of operation of the cover.
Figure 6B:
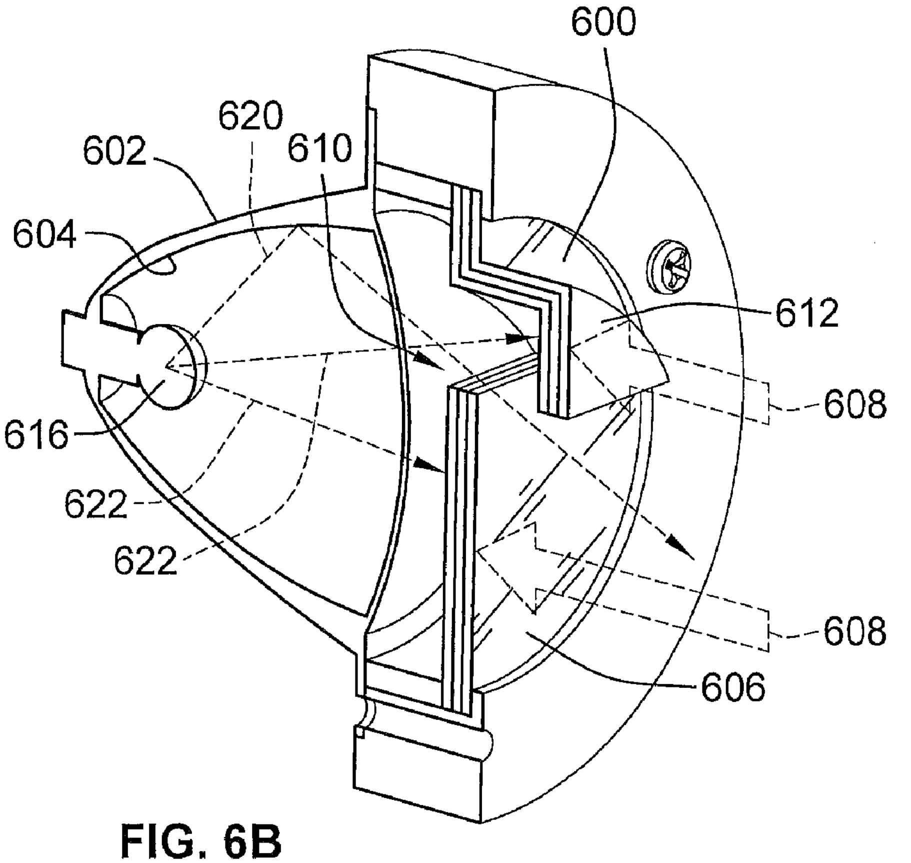
FIG. 6B illustrates another mode of operation of the cover.
Figure 6C:
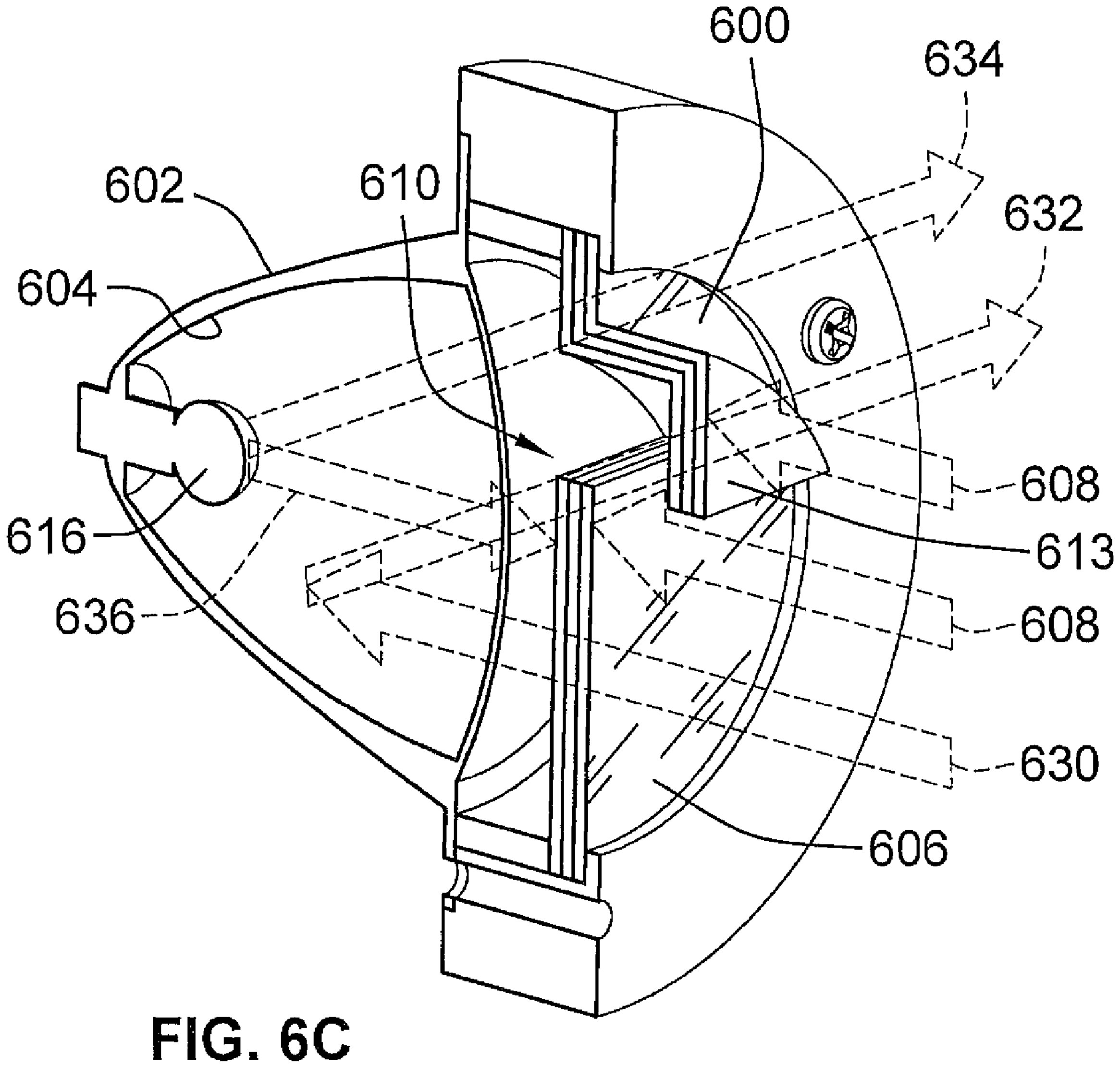
FIG. 6C illustrates a further mode of operation of the cover.

FIGS. 6A-6C schematically illustrate operation of a vehicle light cover 600 in an example implementation. FIGS. 6A-6C each show a cover 600 mounted on a vehicle light assembly 602. The vehicle light assembly 602 includes a reflective inner surface 604.

FIG. 6A shows the vehicle light cover 600 in a first state such as a light transmissive state in which the vehicle light 602 operates normally and detection of the vehicle is not a concern. The vehicle light 602 may be 'on' causing light 603 from light source 616 to be generated outward through the vehicle light cover 600. However, when the light source 616 is 'off,' incident light 608 may pass through the cover 600 and reflect off of the reflective inner surface of light reflector 604 of the light assembly 602. Such reflected light would enable detection of the vehicle even when the vehicle light assembly 602 is 'off.' Depending on the material used for the electrochromatic layer of the vehicle light cover 600, the first state may be enabled by energizing, or de-energizing the cover 600 as described above with reference to FIG. 4. When the vehicle light cover 600 changes states, the state of a light source 616 may or may not change. For example, the light source 616 may switch off when the cover 600 switches to a light inhibiting state. Or, the light source 616 may be left on even thought the cover 600 has switched to a light inhibiting state.

FIG. 6B shows the vehicle light cover 600 in a second state such as a light inhibiting state. In the light inhibiting state, the electrochromatic lens 606 of cover 600 blocks incident light 608 to reduce detection of the vehicle. By blocking out the external ambient light 608, such light rays are inhibited from being reflected off the light reflector 604 of the light assembly 602 reducing the chance of detection in the dark during battlefield conditions. With the light source 616 'on' when the cover 600 is in the light inhibiting state, the beam pattern exiting the cover 600 is confined and limited with only a small amount of reflected light 620 traveling in a downward direction through the opening between the bottom of the slot 610 and the bottom vertical wall of the baffle 612 of the lens 606 passes through the cover 600. Light 622 emanating from the light source 616 that engages the electrochromatic lens 606 and baffle 612 is blocked when the cover 600 is in the light inhibiting state.

FIG. 6C shows an application in which the vehicle light cover 600 includes an electrochromatic material that selectively allows light having wavelengths in a selected range to pass through while blocking light in other wavelengths ranges. In FIG. 6C, selected incident light 630 in a selected wavelength range is allowed to pass through by the lens 606 of cover 600 and reflect off the reflective inner surface 604 as reflected light 632. Other incident light 608 in another wavelength range is blocked, such as visible light, for example. In the application illustrated by FIG. 6C, the selected wavelength range for the incident light allowed to pass at 630 may be for light in the range from 700 nanometers to a 1200 nanometers. In addition, light generated by the light source 616 may continue to emit if left on after the vehicle light cover 600 changes states. If the light is left on, infrared light 634 emitting from the light source 616 may pass through the cover 600, but visible light 636 emitting from the light source 616 may be blocked. As with the example in FIG. 6B, reflected light from the light source 616 that travels through the open area between the bottom of the slot 610 and the bottom of the vertical wall 613 of the baffle 612 is allowed to pass through the cover.

The selected wavelength may be in the infrared spectrum, for example. While light that is visible with the naked eye may be blocked at 608, light in the infrared may be allowed to pass. In this manner, a vehicle may be detected by friendly personnel equipped with detectors able to detect the infrared emitted by the vehicle's lights. The visible light emitted by the vehicle's lights would be blocked allowing the vehicle to escape detection by enemy personnel that lack detectors of infrared, such as for example, night vision goggles (NVG).

Figure 7:
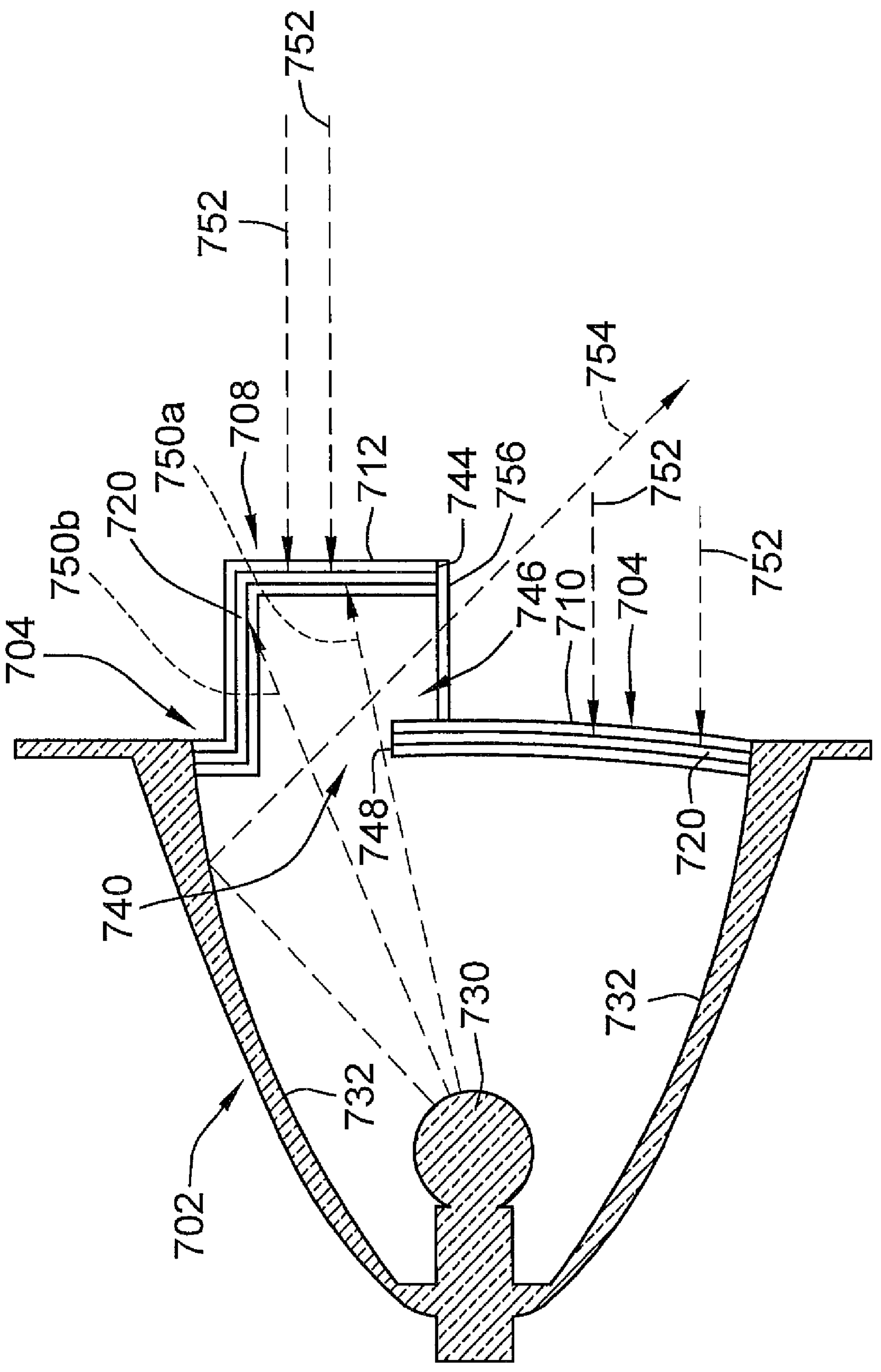
FIG. 7 illustrates an alternative embodiment of the cover with a lens being integral with the vehicle light module housing.

FIG. 7 illustrates an alternative embodiment in which the lens 704 acts as a cover for the light module housing 702. In this example, the lens 704 engages with the light reflector 732 of the light module 702. The lens 704 together with baffle 708 have an electrochromatic layer 720 that is switchable between the light transmissive and the light inhibiting state. In the light inhibiting state, the lens 704 and baffle 708 block external ambient light 752 from traveling into the vehicle light module 702 to prevent reflection of such light off the light reflector 732. In this state, the baffle 708 also blocks light (e.g., 750*a*, *b*) emitted from the light source 730 that has passed through the slot opening 740 from exiting the light module 702 in generally upward and forward directions. To create a narrowly concentrated beam of light (see FIG. 3) traveling in a generally downward direction, only a portion of reflected light 754 that was reflected off the light reflector 732 exits the lens 704 through the slot opening 740 and an opening 746 between the vertical wall 712 of the baffle 708 and a lower wall 748 of the lens body 710 is able to pass through the lens. In this embodiment, a transparent material 756 such as plastic or glass may be used to enclose the opening area 746 of lens 704 allowing the select portion of light 754 to be transmitted downward from the light module 702 while also providing a physical seal for the light source 730. The transparent layer 756 (without having electronically activatable material), in this example, extends from the bottom end 744 of vertical wall 712 to the lens body 710. The lens 704 may be releasably or permanently secured to the light reflector 732.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A cover for use in connection with a vehicle light, the vehicle light having a light source and a light reflector, comprising:

a lens having an electrically activatable material switchable between a light inhibiting state and a light transmissive state, the electrically activatable material prevents the transmission of visible light from entering into and reflecting out from the vehicle light when the electrically activatable material is set to the light inhibiting state;

the lens having an area without the electrically activatable material such that visible light from the light source is able to pass through the area; and a baffle extending from a body of the lens, the baffle comprising the electrically activatable material such that the baffle blocks a portion of the visible light that passes through the area of the lens when the electrically activatable material is in the light inhibiting state.

2. The cover of claim 1 wherein the electrically activatable material comprises at least one layer of electrochromatic film.

3. The cover of claim 2 wherein the at least one layer of electrochromatic film is affixed to at least one layer of a transparent material of the lens.

4. The cover of claim 3 wherein the transparent material is a glass or a polycarbonate material.

5. The cover of claim 4 wherein the transparent material is glass material comprising at least one of:

(a) plexiglass; and (b) bullet resistant glass.

6. The cover of claim 2 wherein the electrochromatic film is disposed between layers of transparent material of the lens.

7. The cover of claim 6 wherein the lens is housed in a bezel adapted to be removably affixed to the vehicle light.

8. The cover of claim 2 further comprising a coupling device adapted to electrically couple, at least in part, the electrically activatable material to an electrical power source; and an actuator adapted to prompt switching of the electrically activatable material of the lens between the light inhibiting state and the light transmissive state.

9. The cover of claim 8 wherein the area without the electrically activatable material further comprises a slot opening of the lens.

10. The cover of claim 9 wherein the baffle is integral with the lens.

11. The cover of claim 10 wherein the baffle further comprises a substantially vertical wall spaced apart from the body of the lens wherein the substantially vertical wall is adapted to block visible light when the electrically activatable material is in the light inhibiting state.

12. The cover of claim 11 wherein the baffle further comprises a lateral partition that connects the substantially vertical wall to the body of the lens and wherein the lateral partition is adapted to block visible light when the electrically activatable material is in the light inhibiting state.

13. The cover of claim 12 wherein the substantially vertical wall of the baffle is spaced apart from and aligned in a substantially parallel direction with the slot opening.

14. The cover of claim 13 wherein the length of the substantially vertical wall is greater than the length of the slot opening.

15. The cover of claim 13 wherein a bottom end of the slot opening is positioned above a bottom end of the substantially vertical wall of the baffle.

16. The cover of claim 13 wherein only a portion of reflected light that has reflected off the light reflector from the light source exits the lens through the slot opening and an opening between the substantially vertical wall of the baffle and a lower wall of the body of the lens.

17. The cover of claim 8 wherein the baffle is adapted to block light rays originating from the light source from traveling in a generally upward and forward direction from the vehicle when the electrically activatable material is set to the light inhibiting state.

18. The cover of claim 8 wherein the lens and the baffle block external ambient light from traveling into the vehicle light to prevent the external ambient light from reflecting off the light reflector when the electrically activatable material is set to the light inhibiting state.

19. The cover of claim 1 wherein the electrically activatable material comprises at least one of:

(a) suspended particle device (SPD) material;

(b) liquid crystal display (LCD) material; and (c) phase dispersed liquid crystals (PDLCs).

20. The cover of claim 1 wherein the vehicle light is a military combat vehicle light or a security vehicle light.

21. The cover of claim 20 wherein the electrically activatable material is adapted to selectively pass light of a particular spectrum and block out light at wavelengths outside of the spectrum.

22. The cover of claim 21 wherein the electrically activatable material selectively passes light ranging from 700 nanometers to 1200 nanometers.

23. The cover of claim 20 wherein the electrically activatable material becomes opaque upon being electrically energized and the electrically activatable material becomes transparent upon being electrically de-energized.

24. The cover of claim 23 wherein the electrically activatable material becomes electrically energized upon reaching a voltage potential threshold such that the lens having the baffle does not allow the transmission of ambient light into the light reflector of the vehicle light when the electrically activatable material is electrically energized.

25. The cover of claim 23 wherein the electrically activatable material of the lens and the baffle is adapted to block the transmission of ambient light from entering the vehicle light upon being electrically energized.

26. The cover of claim 20 wherein the electrically activatable material becomes opaque upon being electrically de-energized and the electrically activatable material becomes transparent upon being electrically energized.

27. The cover of claim 26 wherein the electrically activatable material becomes electrically de-energized upon reaching of a voltage potential threshold such that the lens having the baffle does not allow the transmission of ambient light into the light reflector of the vehicle light when the electrically activatable material is electrically de-energized.

28. The cover of claim 26 wherein the electrically activatable material of the lens and the baffle is adapted to block the transmission of ambient light from entering the vehicle light upon being electrically de-energized.

29. The cover of claim 20 wherein the actuator is positioned at a control panel within the vehicle and wherein the actuator comprises at least one of:

(a) a switch;

(b) panel touch screen;

(c) button; and (d) sensor.

30. The cover of claim 20 wherein the actuator comprises at least one of: (a) a hardwired switch; (b) a software switch; and (c) wireless control.

31. The cover of claim 20 wherein the electrical power source comprises at least one of: (a) vehicle power coupled with a control panel of the vehicle; (b) a vehicle battery coupled with the control panel of the vehicle; and (c) an accessory battery coupled with the control panel, the control panel adapted to re-charge the accessory battery based on conditions of a vehicle battery.

32. The cover of claim 20 wherein the lens is secured to the light reflector of the vehicle light.

33. A method of utilizing a cover for use in connection with a vehicle light, the vehicle light having a light source and a light reflector, comprising:

providing a lens having an electrically activatable material switchable between a light inhibiting state and a light transmissive state, the electrically activatable material prevents the transmission of visible light from entering into and reflecting out from the vehicle light when the electrically activatable material is set to the light inhibiting state;

providing an area of the lens without the electrically activatable material such that the visible light from the light source is able to pass through the area; and extending a baffle from a body of the lens, the baffle comprising the electrically activatable material such that the baffle is adapted to block a portion of the visible light that passes through the area of the lens when the electrically activatable material is in the light inhibiting state.

34. The method of claim 33 wherein the electrically activatable material comprises at least one layer of electrochromatic film and further comprising:

affixing the at least one layer of electrochromatic film to at least one layer of transparent material of the lens.

35. The method of claim 34 further comprising disposing the electrochromatic film between layers of transparent material of the lens.

36. The method of claim 33 further comprising electrically coupling, at least in part, the electrically activatable material to an electrical power source; and switching the electrically activatable material between the light inhibiting state and the light transmissive state.

37. The method of claim 36 further comprising electrically activating the electrically activatable material from a crew compartment of the vehicle.

38. The method of claim 36 further comprising permanently securing the lens to the light reflector of the vehicle light.

39. The method of claim 36 wherein the area without the electrically activatable material further comprises a slot opening of the lens and wherein the baffle is integral with the lens.

40. The method of claim 39 further comprising providing a substantially vertical wall spaced apart from the body of the lens wherein the substantially vertical wall is adapted to block visible light when the electrically activatable material is in the light inhibiting state.

41. The method of claim 40 further comprising blocking visible light with a lateral partition of the baffle when the electrically activatable material is in the light inhibiting state, the lateral partition connects the substantially vertical wall to the body of the lens.

42. The method of claim 41 further comprising spacing the substantially vertical wall of the baffle apart from and in a substantially parallel direction with the slot opening.

43. The method of claim 42 further comprising positioning a bottom end of the slot opening above a bottom end of the substantially vertical wall of the baffle.

44. The method of claim 42 further comprising permitting only a portion of reflected light that has reflected off the light reflector from the light source to exit the lens through the slot opening and an opening between the substantially vertical wall of the baffle and a lower wall of the body of the lens.

45. The method of claim 36 further comprising blocking, with the baffle, light rays originating from the light source from traveling in a generally upward and forward direction from the vehicle when the electrically activatable material is set to the light inhibiting state.

46. The method of claim 33 wherein the electrically activatable material comprises at least one of:

(a) suspended particle device (SPD) material;

(b) liquid crystal display (LCD) material; and (c) phase dispersed liquid crystals (PDLCs).

* * * * *